(12) United States Patent
Cain et al.

(10) Patent No.: US 6,399,138 B1
(45) Date of Patent: Jun. 4, 2002

(54) STEROL CONCENTRATES ITS APPLICATION AND PREPARATION

(75) Inventors: Frederick William Cain; John Bernard Harris, both of Wormerveer (NL); Stephen Raymond Moore, Sharnbrook (GB); Gerald Patrick McNeill, Glen Ellyn, IL (US); Maarten Johan Klaassen, Wormerveer (NL)

(73) Assignee: Loders Croklaan B.V., Wormerveer (NL)

( * ) Notice: Subject to any disclaimer, the term of this patent is extended or adjusted under 35 U.S.C. 154(b) by 0 days.

(21) Appl. No.: 09/438,400

(22) Filed: Nov. 12, 1999

(30) Foreign Application Priority Data

Nov. 13, 1998 (EP) ............................................ 98309287

(51) Int. Cl.[7] .............................................. A23D 9/007
(52) U.S. Cl. ........................ 426/611; 426/564; 426/565; 426/570; 426/572; 435/271; 552/544; 552/545; 514/170; 514/171; 514/182
(58) Field of Search ................................ 426/601, 611, 426/564, 565, 570, 572, 613; 435/271; 514/170, 171, 182; 552/544, 546, 545

(56) References Cited

U.S. PATENT DOCUMENTS

| | | | |
|---|---|---|---|
| 5,679,393 A | 10/1997 | Laur et al. | 426/417 |
| 6,149,961 A | 11/2000 | Kepplinger et al. | 426/553 |
| 6,228,407 B1 * | 5/2001 | Kepplinger et al. | 426/321 |

FOREIGN PATENT DOCUMENTS

| | | |
|---|---|---|
| EP | 0503650 A2 | 9/1992 |
| FR | 2 691 974 | 12/1993 |
| GB | 932662 | 7/1963 |
| WO | WO 98/01126 | 1/1998 |
| WO | WO 99/63031 | 12/1999 |
| WO | WO-01/03712 A2 | 1/2001 |

OTHER PUBLICATIONS

Kershaw. 1981. Heterogeneity within Commercial Contract Analysis Samples of Shea–Nut Kernels, JAOCS, p. 706–710.

Westrate. 1998. European J. of Clinical Nutrition 52:334–343.

Swern. 1979. Baileys Industrial Oil and Fat Products, vol. 1, 4th edition. John Wiley and Sons, New York, p. 323, 328.

Peers, J. Sci. Fd. Agric., 28:1000–1009 (1977).

Database WPI, Week 9212, AN 92–093064, XP002101011 (Feb. 6, 1992).

Database WPI, Week 9509, An 95–063965, XP002020183 (Dec. 13, 1994).

* cited by examiner

*Primary Examiner*—Carolyn Paden
(74) *Attorney, Agent, or Firm*—Morgan, Lewis & Bockius LLP

(57) ABSTRACT

The invention concerns concentrates of shea sterols in glycerides with more than 12.5 wt % shea sterols, the preparation thereof by enzymic hydrolysis of glycerides in shea oils or fractions thereof and the application of the concentrates in aerated food products.

11 Claims, No Drawings

STEROL CONCENTRATES ITS APPLICATION AND PREPARATION

BACKGROUND OF THE INVENTION

Aerated food products, such as creams, cream alternatives, ice cream, confectionery and bakery fillings are well known. In order to achieve a satisfactory aerated food product with a good overrun and/or firmness emulsifier systems are applied in these products. However the emulsifiers applied sofar, resulting in acceptable products are based on known emulsifier systems such as lecithins, mono- and diglycerides, DATA-esters, polyglycerolesters, etc. Some of these systems are natural, others have to be synthesized, however none of them are known as having benificial health effects.

Therefore we studied whether we could find systems that could replace above known emulsifier systems in aerated products while taking over a number of their benificial effects and adding a number of health benefits.

This study resulted in the finding that the application of shea sterol concentrates in aerated food products could combine both beneficial effects. Shea sterol concentrates being concentrates of shea sterols as present in shea oil, so having the same chemical composition as the sterols in shea oil.

DESCRIPTION OF RELATED PRIOR ART

From a number of literature references it is known that sterols present in natural oils can have plasma cholesterol lowering effects. E.g. Weststrate c.s. in Eur. J. clin. Nutr. 52, 1998, p334–343 or Seetharamaiah c.s. in J. Food Science and Techn. 23(1986), p.270–273 and Rukmini c.s. in J. Amer. College of Nutrition 10(1991), p.593–601 disclose the health benefits of oryzanol, i.e. rice bran oil sterols, the main component of oryzanol being cycloartenol. i.e. a 4,4-dimethylsterol with the structure as given in Rukmini's article. In above references it is also disclosed that oryzanol has serum cholesterol lowering effects. Similar effects have also been disclosed for other plant sterols, c.f.WO 92/19640 and Kochhar, Prog.Lipid Res.22, (1983) p.161–188. The most active forms are according to the literature sito-sterol (=a 4-desmethylsterol) or hydrogenated derivatives thereof.

In particular the sterols wherein the 3-OH group is present in esterified form are mentioned as active.

It should be understood that the term "sterol" covers 4-desmethylsterols, 4-monomethylsterols and 4.4-dimethylsterols, as defined in Kochhar. This definition includes free sterols, ie having a free 3-hydroxy, group and esterifired sterols, ie sterols having an ester group. derived from fatty acids or phenolic acids at the 3-position.

A problem related with the commercial use of these sterols is the fact that isolation or concentration of the sterols from natural sources is a difficult process. One of the problems indicated e.g. in Kochhar and in Seetharamaiah is that a treatment wherein a refining is applied, using physical means like a solid absorbent or steam easily will result in a deterioration of the sterols, sothat in stead of performing a concentration of the sterols a product is obtained with a lower or maximum the same sterol concentration as present in the starting material. Other concentration techniques, like distillation fail as well, because the natural oils contain a number of components, such as mono- and diglycerides, which cannot be separated from the sterols by distillation techniques, because the partial vapor pressures of these components are very similar.

Although Kochhar gives an extensive overview of the different sterols present in different natural oils it remained a problem to obtain concentrates of useful sterols in concentrations high enough to enable a commercial application of these products.

Shea sterols mainly consist of alpha-amyrin, beta-amyrin, butyrospermol and lupeol, which are all 4,4-dimethylsterols. We found that concentrates of shea-sterols perform very well, when applied in aerated products.

SUMMARY OF THE INVENTION

Therefore our invention concerns in the first place concentrates of shea-sterols, in particular concentrates of sterols in glycerides, wherein the concentrate contains at least 12.5 wt %, preferably at least 15 wt %, most preferably at least 20 wt % of shea sterols.

DETAILED DESCRIPTION OF THE INVENTION

One of the advantages of our novel concentrates is that the shea-sterols are present in a form that is chemically identical with the sterols, as present in shea oil. Preferred concentrates are concentrates, wherein the shea sterols comprise substantial amounts of 4,4-dimethylsterols, in particular selected from the group consisting of alpha-amyrin, beta-amyrin, butyrospermol and lupeol. In particular concentrates, wherein the shea sterols consist for more than 50 wt %, preferably for more than 65 wt %, most preferably for more than 75 wt % of 4,4-dimethylsterols perform very well.

The shea sterol concentrates can be applied as such, or as a blend with other triglycerides either being triglycerides derived from shea oil or triglycerides not akin to the sterol present in the concentrate. So blends of sterols and triglycerides wherein the blend comprises at least 12.5 wt % of shea sterols and at least 20 wt % of triglycerides with a composition different from shea oil are also part of our invention. Examples of sources for the other triglycerides are liquid oils, such as soybean oil, corn oil, sunflower oil, rapeseed oil, the high oleic derivatives of these oils, but also hardened/fractionated oils, such as soybean oil; hard-soybean oil; h-soybean oil midfraction; palm oil; palmolein; palm midfraction; palm kerneloil; hard palm kernel oil; palm kernel olein.

The sterol concentrates can be applied in aerated (whippable) food products or foodproducts that can be aerated and wherein a fat phase and a water phase is present. Examples thereof being whippable creams, ice cream, and confectionery or bakery fillings. The concentration of the shea sterol concentrate in the food products can range from 1 to 30 wt %, based on total product. In general this will mean that on fat 1–50 wt % of shea-sterols will be present.

Our invention further concerns a process for the concentration of shea sterols by performing the following steps:

(i) selecting a shea oil or shea oil fraction, comprising:
  (a) partial glycerides, present in an amount of Xa-wt %
  (b) triglycerides, present in an amount of Xb-wt %
  (c) shea sterols, present in an amount of Xc-wt % and
  (d) free fatty acids and/or other volatile components, present in an amount of Xd-wt %
(ii) subjecting this shea oil or shea oil fraction to an enzymic hydrolysis, such that
  (1) the amount of component (a) is reduced from Xa to 0–0.95Xa
  (2) the amount of component (b) is maintained or reduced from Xb to 0-Xb wt %

(3) the shea sterols (c) are substantially not converted and (4) the amount of fatty acids and/or other volatile components (d) is increased from Xd to >1.05Xd (iii) the components (d) and (b) are removed by one or more physical separation methods and a concentrate of shea sterols with more than 12.5 wt % sterols is recovered.

In above process the value of Xa in our starting material preferably is 0.5–85 wt %, the value of Xb is preferably 0.1–94 wt %, the value of Xc is preferably 0.1–90 wt % and the value of Xd is preferably 0.05–60 wt %, it should however be obvious that the total of Xa–Xd never can be more than 100 wt %, so that the compounds a–d are not always present in the preferred amounts simultaneously.

The enzymic hydrolysis can be performed as a hydrolysis using enzymes specific for the hydrolysis of mono- and diglycerides, so that these partial glycerides are converted to free fatty acids and glycerol, which compounds easily can be separated from the shea sterols and the triglycerides by physical separation methods. Alternatively higher concentrations of the shea sterols in the concentrate can be obtained if the total starting material is first subjected to a partial enzymic hydrolysis using an enzyme that can hydrolyse all kinds of glycerides present. The resulting reaction mixture will be enriched in free fatty acids, partial glycerides and glycerol. This crude reaction mixture will now be subjected to the enzymic treatment with the enzyme specific for the removal of partial glycerides. The reaction mix resulting from this treatment again will contain components which easily can be separated by physical separation means, such as distillation.

It is of course also possible to perform a one-step hydrolysis using an enzyme or enzyme mixture that can hydrolyze mono-, di- and triglycerides.

By above process shea sterol concentrates can be obtained that contain 12.5–100 wt %, in particular 15–80, more particular 25–70 wt % of sterols.

Shea oil is known to contain about 4 wt % of total sterols, whereas this amount can be as high as 12 wt % for shea oil olein fractions. Therefore these materials are excellent starting materials for the preparation of concentrates that contain high levels of the shea sterols.

As stated above the reaction mixture resulting from the enzymic treatment will contain appreciable amounts of free fatty acids, glycerol and in general triglycerides, in addition to the sterols. The free fatty acids and the glycerol are relatively volatile compounds in this mixture and can be removed by physical separation processes, that do not affect the chemical sterol composition negatively. Examples of such processes are distillation processes, in particular distillation processes under vacuum. On a commercial scale an example of such a process is molecular distillation under reduced pressure.

EXAMPLE 1

A shea oil of composition; TG 74.8%, DG 7.2%, MG 0.2%, FFA 12%, sterols 5.8% was fractionated in acetone at a temperature of 0 C. to give an oleine fraction which, after solvent removal, had the following composition: TG 62.7%, DG 10%, MG 0.3%, FFA 18%, sterols 9%. This fraction was subjected to a partial glyceride selective hydrolysis, with a lipase from penecillium camembertii (lipase G ex Amano), to give an oil of the following composition: TG 62.3%, DG 2%, FFA 26.6%, sterols 9.1%. This oil was evaporated at 200 C. under a vacuum of 0.5 mbar, using a short path evaporator to give an oil with the following composition: TG 82.5, DG 2.2%, FFA 1.3%, sterols 14%.

EXAMPLE 2

A shea oil oleine of the composition in example 1 was subjected to a hydrolysis with an enzyme which acts on triglycerides, i.e. Humicola, to give an oil with the following composition; TG 29.4%, DG 24.8%, MG 5%, FFA 31.9%, sterols 8.9%. This oil was then treated with a partial glyceride selective lipase, i.e. lipase G ex Amano, to give an oil with the following composition; TG 29.3, DG 3.1, FFA 58.4, sterols 9.2. This oil was evaporated at 200 C. under a vacuum of 0.5 mbar to give an oil with the following composition; TG 66.4%, DG 6.8%, FFA 6.6%, sterols 20.2%.

EXAMPLE 3

A shea oil was fractionated in acetone at a temperature of 0° C. to give an oleine fraction which, after solvent removal, had the following composition: TG 68.2%, DG 9.5%, MG 0.3%, FFA 15%, sterols 7.0%. This fraction was subjected to a partial glyceride selective hydrolysis, with a lipase mixture from Lipase G (ex Amano), 0.023% and *Candida rugosa* (Lipase AY), 0.032%, in an oil to water ratio of 1:1.5 to give an oil of the following composition: TG 1.6%, DG 1.3%, MG 0.3%, FFA 88%, sterols 7.9%, others 0.9%. This oil was evaporated at 215° C. under a vacuum of 3 mbar, using a fatty acid evaporator to produce an oil of composition TG 11.6%, DG 3.6%, MG 0.1%, FFA 39%, sterols 38.5%, others 7.2%. This oil was further evaporated via two passes of a short path evaporator at (I) 150–190° C. and (II) 260–275° C. under a vacuum of 30 μbar, to give an oil with the following composition: TG 2%, DG 7.8%, MG 0.1%, FFA 0.5%, sterols 80.6%, others 9%.

EXAMPLE 4

A shea oil oleine of composition TG 70.5%, DG 7.3%, MG 0.07%, FFA 12%, sterols 7.5%, others 2.63% was subjected to a partial glyceride selective hydrolysis, with a lipase mixture from Lipase G (ex Amano) 0.023% Candida rugosa (Lipase AY), 0.032% using an oil to water ratio of 1:0.5 to give an oil of the following composition: TG 3.8%, DG 2.8%, MG 0.1%, FFA 80.7%, sterols 7.1%, others 5.5%. This oil was evaporated at 230° C. under a vacuum of 5 mbar, using a fatty acid evaporator to produce an oil of composition TG 31.05%, DG 7.38%, MG nd %, FFA 20.70%, sterols 23.73%, others 17.14%. This oil was further evaporated via two passes of a short path evaporator at (I) 190° C. under a vacuum of 0.03 mbar and (II) 270° C. under a vacuum of 0.03 mbar, to give an oil with the following composition: TG 13%, DG 14.8%, MG 0.2%, FFA 17.6%, sterols 51.8%, others 3.1%.

EXAMPLE 5

A sterolester concentrate with 80% shea sterols and 4.9 wt % diglycerides was mixed with an equal amount of sunflower fatty acids and then subjected to a treatment with an enzyme, Amano G, to remove the diglycerides. By this treatment the diglyceride content was reduced from 4.9 to 0.3%.

To reduce the viscosity of the product an extra amount of palm-mid fraction was added. The composition was then 77% hydrolysed blend and 23% of palm-mid fraction. Then, by a short path distillation, the free fatty acids were removed.

This final product, which had the following calculated composition:

59% Sterolesters
41% palm-mid fraction was diluted with palm-mid fraction to a final blend with the following composition:

93% palm-mid fraction
7% Sterolesters

The whipping properties of this final blend (=blend 2) were compared with:

palm-mid fraction (=reference)
palm-mid fraction mixed with sterolester concentrate, ratio 93/7 (blend 1)

The whipping properties were measured by making an emulsion, 1000 g of fat and 200 g of water was used. After cooling the fat from 50 to approx. 20° C., the water was added to the fat. Then in a Hobart mixer this mixture was whipped at medium speed during 15 minutes. At t=0 and after 15 minutes the density was measured and the overrun was calculated.

Whipping Properties
The following results were obtained:

TABLE 2

|  | Reference palmmidfraction | Blend 1 | Blend 2 |
| --- | --- | --- | --- |
| Density (g/cm³) |  |  |  |
| t = 0 | 0.93 | 0.94 | 0.94 |
| t = 15 min. | 0.74 | 0.59 | 0.49 |
| Overrun (%) | 19.8 | 58.5 | 91.6 |
| Diglycerides, (%) on fatphase | 1.0 | 1.4 | 1.1 |

The results of these tests, summarised in the table, showed that the removal of the diglycerides till the level present in the reference fat, gave an overrun which is not only higher than the reference fat but also higher than blend 1 which has a higher diglyceride content.

EXAMPLE 6

Two batches of ice cream were made according to the following recipe:

| fat | 10 wt % |
| --- | --- |
| skimm milk powder | 10 |
| icing sugar | 12 |
| corn syrup solids | 4 |
| dextrose monohydrate | 2 |
| water | 62 |

In the first experiment the fat phase consisted of 100% palm mid with the following N-line: N20=84.2; N25=71.3; N30=39.1 and N35=1.8. In the second experiment the fat phase consisted of a blend of this palm mid with 10 wt % of a sterol concentrate containing: 9.0% triglycerides; 8.6% diglycerides; 0.1% monoglycerides; 0.4% free fatty acids; 1.3% free sterols and 80.6% shea sterolesters.

The following procedure was followed:
All ingredients except fat and water were mixed. To this mix cold water was added and the mixture was heated until 70° C. Then the fat, respectively the fat/sterol blend was added under stirring. The emulsion obtained was cooled until 25° C. and the emulsion was frozen in an ice cream machine (held at −18° C. for at least 24 hrs) for 20 min. The ice cream was whipped in a Hobart mixer at maximum speed and overrun was measured. The results are given below for 100 ml product:

TABLE 3

| Added sterol concentrate | Weight of 100 ml | | |
| --- | --- | --- | --- |
| wt % | Before whipp | After whipp | Overrun % |
| 0% | 92.7 | 65.2 | 42.2 |
| 1% | 92.7 | 52.1 | 77.9 |

EXAMPLE 7

The following products were made by using blends of vegetable fat and the sterolconcentrate 80%. The blends of fat and sterolconcentrate were cooled at ambient and used after at least 24 hours.

7.1 Cake
Reference: Biskien zacht
Sample: 95/5 Biskien zacht/Sterolconcentrate 80%.

| Recipe: | |
| --- | --- |
| Fat | 200 g |
| Sugar | 200 g |
| Whole egg | 200 g |
| Flour | 200 g |

Sterolconcentrate on final product: 1.25%.

Results
As a criterion for the whipping properties the volume of the batter was used, the following results have been obtained:

| Type of fat: | Batter density (g/cm³) |
| --- | --- |
| Biskien zacht | 0.90 |
| 95/5 Biskien zacht/Sterolconc. 80% | 0.80 |

7.2 Wafer Cream
Reference, a blend of palm olein (Pof) and hard, palm olein with a melting point of 37° C. (Pof37).
Sample: blend of equal amounts of sterol concentrate and the reference fat.

| Recipe: | |
| --- | --- |
| Sugar | 50% |
| vegetable fat | 40% |
| skimmed milkpowder | 10% |

Sterolconcentrate on final product: 20.0%.

Results
This product was made by mixing followed by whipping in a Hobart N 50 mixer.
After whipping the density of the whipped product was measured.

| Type of fat: | Density after whipping, (g/cm³) |
|---|---|
| Pof/Pof-37 | 0.90 |
| 50/50 (Pof/Po-f-37) and sterol concentrate | 0.81 |

7.3 Water Containing Filling
Reference: Po-f/Po-f-37
Sample: (Po-f/Po-f-37)/Sterol concentrate in ratio, 70/30.

| Recipe: | |
|---|---|
| Vegetable fat | 33.7% |
| Dextrose | 17.0% |
| Sucrose | 13.3% |
| dairy cream, 20% fat | 7.0% |
| butterfat | 5.0% |
| water | 12.5% |
| lactose | 6.0% |
| honey | 2.5% |
| corn syrup | 2.0% |
| Myvatex cream base 31 | 0.56% |
| Salt | 0.3% |
| citric acid | 0.1% |

Sterolconcentrate on final product: 10.1%.
Results

This filling was also made by using a Hobart N50 type mixer. The syrup phase, (sugars and other water soluble ingredients) was added to the whipped fat phase. After mixing these two phases the density was measured.

| Type of fat: | Density after whipping, (g/cm³) |
|---|---|
| Po-37/Po-f-37 | 0.69 |
| 70/30 (Po-37/Po-f-37) Sterolconc. | 0.48 |

7.4 Ice Cream
Reference: Coconut oil
Sample: 80/20 coconut oil/Sterolconcentrate.

| Recipe: | |
|---|---|
| Water | 61.5% |
| Sugar (sucrose) | 12.0% |
| vegetable fat | 10.0% |
| skimmed milk powder | 10.0% |
| corn syrup | 4.0% |
| dextrose | 2.0% |
| emulsifier, Dimodan PVP | 0.5% |
| vanillin | q.s. |

Sterolconcentrate on final product: 2%.
Results

The ice cream was made in a domestic ice cream machine. At the end of the freezing process the density was measured.

After at least 24 hours storage at −18° C. the hardness of the ice cream was measured with the Stevens texture analyser.

| Type of fat: | Density after whipping, (g/cm³) | STA- values, (F) in grammes |
|---|---|---|
| Coconut oil | 1.10 | 923 |
| 80/20 coconut oil/Sterolconc. | 0.84 | 343 |

$d = 2$ mm
$v = 0.5$ mm/s
60° cone

Conclusions

The examples showed clearly that the use of sterol concentrate 80%, which is a natural ingredient, resulted in an improvement of whipping properties. This has been shown by the decrease of the density values.

What is claimed is:

1. Concentrate comprising a blend of sterol esters in fat, wherein the concentrate contains at least 20 wt % of shea sterols of which at least 75 wt % is 4,4-dimethyl sterols, and wherein more than 20 wt % of the fat is derived from another source than shea oil.

2. Concentrate according to claim 1, wherein the shea sterols comprise 4,4-dimethylsterols selected from the group consisting of alpha-amyrin, beta-amyrin, butyrospermol and lupeol.

3. Whippable food products comprising a fat phase, a water phase, and 1–30 wt % based on total product, of a concentrate according to claim 1.

4. Aerated food products obtainable after whipping of a whippable food product comprising a fat phase, a water phase and 1–30 wt % based on the total product, of a concentrate according to claim 1, wherein the aerated food product is selected from the group consisting of ice cream, cream alternatives and confectionery or bakery fillings.

5. The method of improving the properties of a whipped food product including overrun and firmness, which comprises including in said whipped product a concentrate according to claim 1.

6. Process for the concentration of shea sterols in a composition derived from shea oil by performing the following steps:
   (i) selecting a shea oil or shea oil fraction comprising a) partial glycerides in an amount of Xa-wt %, b) triglycerides in an amount of Xb-wt %, c) shea sterols in an amount of Xc–wt % and d) fatty acids and/or other volatile components in an amount of Xd-wt %
   (ii) subjecting this shea oil or shea oil fraction to an enzymic hydrolysis, such that the amount of partial glycerides (a) is reduced from Xa to 0–0.95 Xa, the amount of triglycerides (b) is maintained or reduced from Xb to 0-Xb, the shea sterols (c) are substantially not converted and the amount of fatty acids and/or other volatile components (d) is increased from Xd to >1.05 Xd,
   (iii) the components (d) and/or (b) are removed by physical separation techniques and a concentrate of shea sterols with more than 12.5 wt % sterols is recovered.

7. Process according to claim 6, wherein the hydrolysis is performed by using an enzyme or an enzyme mixture that is specific for the conversion of mono and/or diglycerides.

8. Process according to claim 6, wherein the enzymic hydrolysis is performed as a two step hydrolysis, wherein in a first step an enzyme is used capable of hydrolysing triglycerides, whereupon the product obtained then is treated in a second step with an enzyme specific for mono and/or diglycerides.

9. Process according to claim 8, wherein the first step is a partial hydrolysis.

10. Process according to claim 6, wherein the starting shea oil or shea oil fraction has a content of shea sterols of 1–10 wt %.

11. Process according to claim 6, wherein the physical separation is performed as an evaporation under reduced pressure.

* * * * *